(12) United States Patent
Chen et al.

(10) Patent No.: US 7,500,303 B2
(45) Date of Patent: Mar. 10, 2009

(54) METHOD OF FABRICATING A MAGNETIC SENSOR ON A WAFER

(75) Inventors: Tsung Yuan Chen, San Jose, CA (US); Kuok San Ho, Santa Clara, CA (US); Mustafa Michael Pinarbasi, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 342 days.

(21) Appl. No.: 11/437,585

(22) Filed: May 19, 2006

(65) Prior Publication Data

US 2007/0266550 A1 Nov. 22, 2007

(51) Int. Cl.
*G11B 5/127* (2006.01)
*H04R 31/00* (2006.01)

(52) U.S. Cl. .............. 29/603.16; 29/603.13; 29/603.14; 29/603.15; 29/603.18; 216/22; 216/48; 360/316; 360/324.1; 360/324.11; 360/324.12; 427/127; 427/128; 427/129; 427/131

(58) Field of Classification Search .............. 29/603.11, 29/603.13–603.16, 603.18; 360/316, 324.1, 360/324.11, 324.12; 216/22, 48; 427/127–131
See application file for complete search history.

(56) References Cited

U.S. PATENT DOCUMENTS

| 6,493,194 | B1 | 12/2002 | Sakaguchi et al. |
|---|---|---|---|
| 6,570,745 | B1 | 5/2003 | Gill |
| 6,591,481 | B2 | 7/2003 | Shimazawa et al. |
| 6,634,087 | B2 | 10/2003 | Horng et al. |
| 6,657,826 | B2 | 12/2003 | Shimazawa et al. |
| 6,718,623 | B2 | 4/2004 | Sasaki et al. |
| 6,783,874 | B2 | 8/2004 | Hasegawa et al. |
| 6,785,954 | B2 | 9/2004 | Horng et al. |
| 2001/0026424 | A1 | 10/2001 | Kamata et al. |
| 2001/0036045 | A1 | 11/2001 | Kondo |
| 2003/0011943 | A1 | 1/2003 | Webb et al. |
| 2003/0189798 | A1 | 10/2003 | Lin et al. |
| 2003/0189799 | A1* | 10/2003 | Yanagisawa et al. ........ 360/322 |
| 2003/0214761 | A1 | 11/2003 | Freitag et al. |
| 2004/0057163 | A1 | 3/2004 | Lin |
| 2004/0060166 | A1 | 4/2004 | Horng et al. |
| 2004/0257713 | A1 | 12/2004 | Pinarbasi et al. |
| 2005/0007706 | A1 | 1/2005 | Dovek et al. |

* cited by examiner

*Primary Examiner*—Paul D Kim
(74) *Attorney, Agent, or Firm*—G. Marlin Knight

(57) ABSTRACT

A read head for a disk drive and a method of fabricating the read head with overlaid lead pads that contact the top surface of the sensor between the hardbias structures to define the electrically active region of the sensor are described. The invention deposits the GMR and lead layers before milling away the unwanted material. A photoresist mask with a hole defining the active area of the sensor is preferably patterned over a layer of DLC that is formed into a mask. A selected portion of the exposed lead material is then removed using the DLC as a mask defining the active region of the sensor. A photoresist mask pad is patterned to define the full sensor width. The excess sensor and lead material exposed around the mask is milled away. The layers for the hardbias structure are deposited.

17 Claims, 5 Drawing Sheets

METHOD OF FABRICATING A MAGNETIC SENSOR ON A WAFER

FIELD OF THE INVENTION

The invention relates to thin film magnetic transducers for sensing magnetic fields in magnetic recording media and more particularly to magnetic transducers having electrically conductive leads overlaid on top of the magnetic sensor.

BACKGROUND OF THE INVENTION

A typical prior art head and disk system 10 is illustrated in block form in FIG. 1. In operation the magnetic transducer 20 is supported by the suspension 13 as it flies above the disk 16 which rotates. The magnetic transducer 20, usually called a "head" or "slider," is composed of elements that perform the task of writing magnetic transitions (the write head 23) in the magnetic medium included in the thin films 21 and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded. The magnetic domains in the media on can be written longitudinally or perpendicularly. The read and write head portions of the slider are fabricated in layers using thin film processing techniques. Typically the read head is formed first, but the write head can also be fabricated first. The conventional write head is inductive.

In a disk drive using perpendicular recording the recording head is designed to direct magnetic flux through the recording layer in a direction which is generally perpendicular to the plane of the disk. Typically the disk for perpendicular recording has a magnetically hard recording layer and a magnetically soft underlayer. During recording operations using a single-pole type head, magnetic flux is directed from the main pole of the recording head perpendicularly through the magnetically hard recording layer, then into the plane of the soft underlayer and back to the return pole in the recording head. The shape and size of the main pole and any shields are the primary factors in determining the track width.

Perpendicular magnetic recording is considered to be superior to longitudinal magnetic recording for ultra-high density magnetic recording. The increase demand for higher areal density has correspondingly led to increase demand to explore ways to reduce the width of the write pole piece, increase the write field strength, and improve the write field gradient. Experimental evidence and modeling have shown that a trailing shield single pole writer (SPT) design achieves a 4-5 dB media signal to noise advantage over writing with the trailing edge of an unshielded pole, increase in dHy/dx of the head field, reduce partial erasure, and improve saturation. These features improve transition sharpness (linear resolution) and permit higher coercive field media (improved stability).

Lead overlay designs for read sensors provide an advantage in improved stability and amplitude. The primary problem is the width of the read sensor. In this design, track width is controlled by the separation of the electrically conductive leads on top of the sensor that is smaller than the full width of the sensor. A prior art spin valve head 12A with overlaid leads is illustrated in FIG. 2 in a section view taken parallel to the air bearing surface (not shown). The leads 36a, 36b as shown in this particular embodiment include three sublayers: tantalum 37, chromium 38 and rhodium 39. The tantalum and chromium layers serve as seed layers for the rhodium. The leads are deposited in contact with the top surface of the spin valve sensor 35 and the hard bias structures 33a, 33b. The gap layer 31 underlies the two hard bias structures 33a, 33b and the sensor 35. The hard bias structures 33a, 33b are shown as a single element even though they include more than one layer, e.g., a chromium layer (not shown) followed by a CoPtCr layer (not shown). The spin valve 35 is also illustrated as a single entity for simplicity even though it includes several layers.

In published U.S. patent application 20040257713 by Pinarbasi, et al., Dec. 23, 2004, a magnetoresistive sensor with overlaid leads is described with leads having substantially vertical end walls to accentuate sense current near the ends of the leads. Insulating layers isolate the hard bias layers from the path of the sense current. After a first photoresist liftoff structure has been removed, a second layer of photoresist is formed and patterned. The second layer of photoresist does not have the usual undercut liftoff structure. Instead, the second layer of photoresist has substantially vertical walls. Lead material may be conveniently chosen from low resistance, substantially inert conductors such as rhodium, gold, ruthenium, and the like.

In published U.S. patent application 20030011943 by Webb, et al., Jan. 16, 2003, various embodiments of spin valve sensors with overlaid leads are described. A first embodiment for a bottom spin valve deposits a cap layer over the sensor then "notches" to expose the outer edges of the sensor. The overlaid leads are deposited in contact with the exposed side of the sensors. A second embodiment "notches" down through the free layer, as well as, the cap then refills with copper and NiFe before depositing the overlaid leads. A third embodiment "notches" down through the free layer and partially into the spacer and refills with NiFe before depositing the overlaid leads. A fourth embodiment "notches" down through the free layer and completely through the spacer and refills with NiFe before depositing the overlaid leads. A top spin valve embodiment notches through the cap, AFM layer and optionally into or through the pinned layer before forming the leads that contact the pinned layer.

In published U.S. patent application 20050007706 by Dovek, et al., Jan. 13, 2005 describes a design in which an additional antiferromagnetic layer is added under the overlaid leads in a bottom spin valve design. The extra antiferromagnetic layer extends over the hard-bias pads onto the top of the spin valve and is coterminous with the lead material. The longitudinal bias provided by the hard-bias pads extends, it is said, without attenuation right up to the edges of the leads, so that the physical and magnetic widths of the sensor are essentially identical.

SUMMARY OF THE INVENTION

An embodiment of the invention is a read head, which can be used in a disk drive, and a method of fabricating the read head with overlaid lead pads that contact the top surface of the sensor between the hardbias structures to define the electrically active region of the sensor. The invention deposits the giant magnetoresistive (GMR) sensor and lead layers before milling away the unwanted material.

The leads will preferably include two layers with the upper layer preferably being rhodium. Tantalum is another option for the first lead layer. A diamond-like carbon (DLC) layer is deposited. A photoresist mask with a hole defining the active area of the sensor is patterned. The exposed DLC is removed by a reactive-ion etching (RIE) process. The photoresist is stripped. A selected portion of the exposed lead material is then removed using the DLC as a mask. If the first lead layer is tantalum, then both the first and second lead layers will be removed completely from the surface sensor exposed through the DLC mask. The DLC mask is removed. A photoresist mask pad is patterned to define the full sensor width. The excess sensor and lead material exposed around the mask is milled away. The layers for the hardbias structure are deposited. The first layer can rhodium followed by the layers for the hard bias structure. The mask is then removed using a chemical-mechanical polishing (CMP) assisted liftoff. The prior art can be resumed at this point.

In an alternative embodiment, where the first lead layer is ruthenium, then the second lead layer will be removed completely in the active area of the sensor, but the ruthenium layer can be left in place. When ruthenium is used for the lower lead layer, it can also optionally be the cap layer for the sensor.

DETAILED DESCRIPTION OF THE INVENTION AND THE PREFERRED EMBODIMENTS

Figure 1:
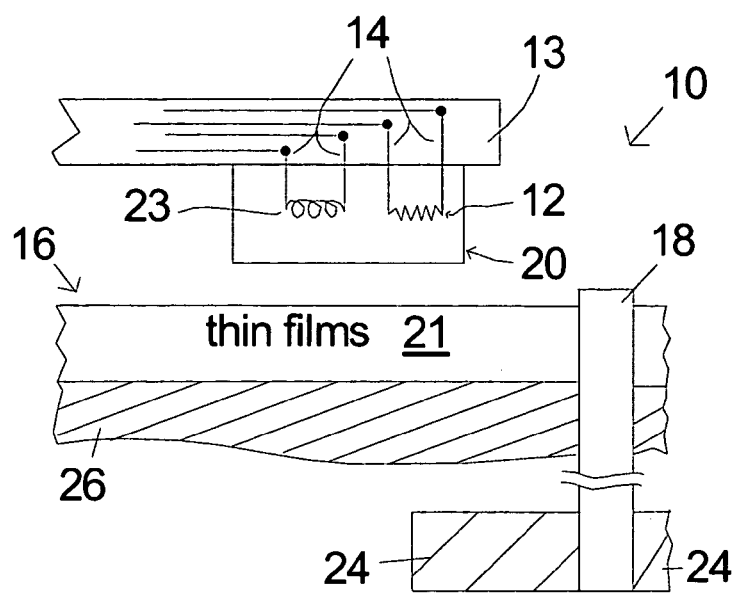
FIG. 1 is a symbolic illustration of selected components in a prior art disk drive.
Figure 2:
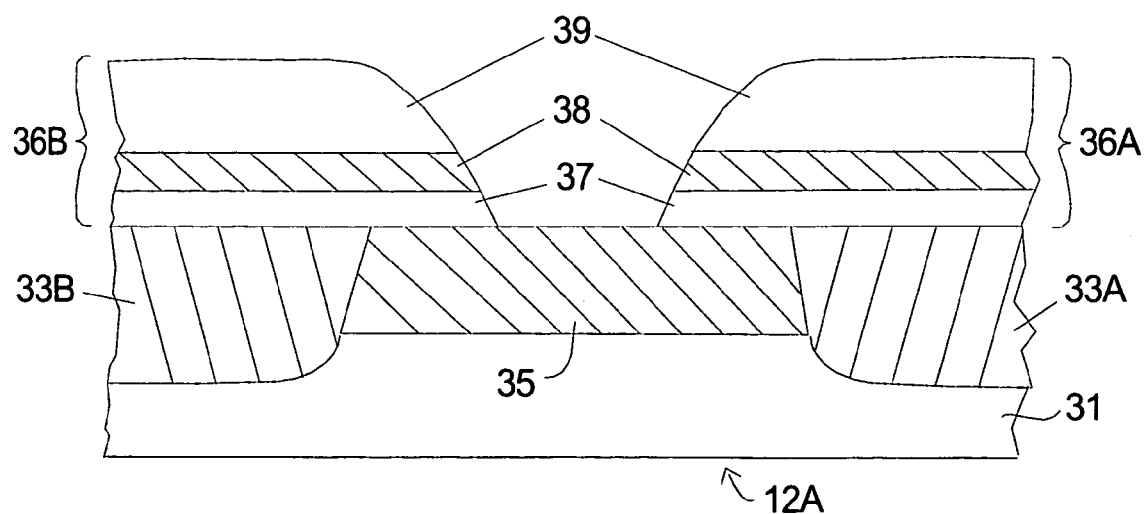
FIG. 2 is a symbolic illustration of a section, taken parallel to the air-bearing surface, of a prior art read sensor with overlaid leads.
Figure 3:
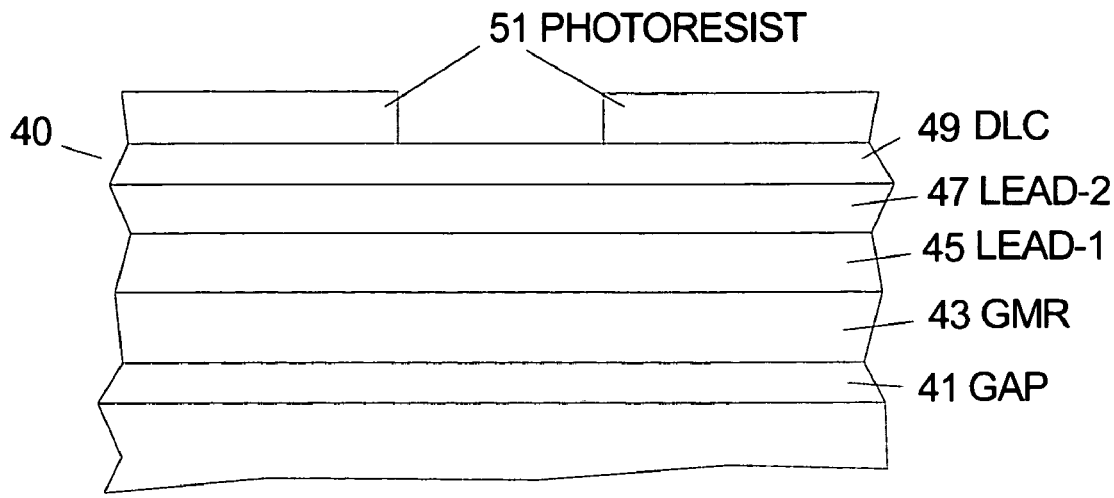
FIG. 3 is a symbolic illustration of a section, taken perpendicular to the surface of a wafer after initial steps in a method of fabricating a sensor according to the invention.

A first embodiment of the invention is a read head with overlaid leads that only contact the top of the sensor along a confined area. FIG. 3 is a symbolic illustration of a plan view of a wafer 40 at a first stage in a process of fabricating a sensor with overlaid leads according to the first embodiment of the invention. The figures are not according to scale, since the large range of sizes would make the drawings unclear. Except were noted the dimensions are according to the prior art. The invention deposits the GMR and lead layers full film on the wafer before milling away the unwanted material. The stack of sensor material layers 43 has been deposited on the gap layer 41 according to the prior art. The leads preferably include two layers of electrically conductive material: lead-1 45 and lead-2 47. The first lead layer 45 is an electrically conductive material such as tantalum or ruthenium. Use of ruthenium for lead-1 is a special embodiment that will discussed further below. A conductive metal such as rhodium is preferably used for the lead-2 47 material. A mask layer 49 preferably of DLC is deposited full film over the wafer onto the upper lead-2 layer. The patterned photoresist 51 includes a hole that defines the active area of the sensor where the lead layers will be removed.

Figure 4:
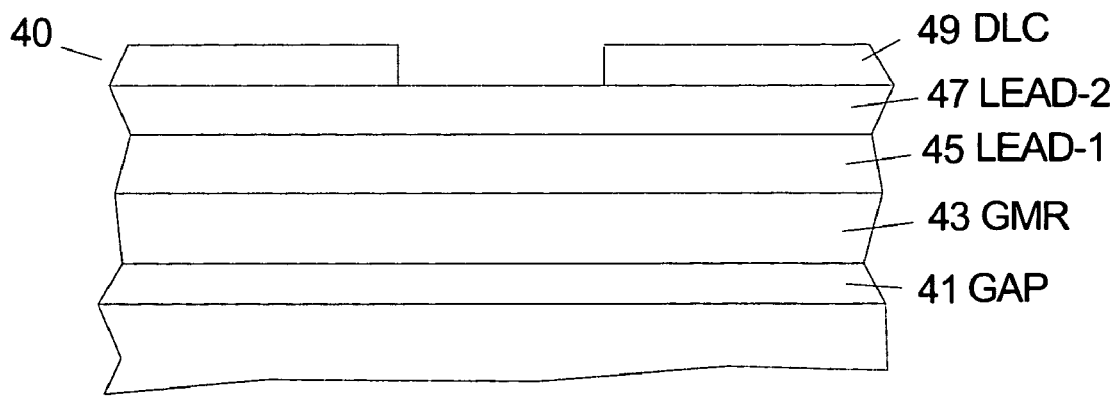
FIG. 4 is a symbolic illustration of a section, taken perpendicular to the surface of a wafer subsequent to FIG. 3, after the DLC layer has been milled and the photoresist mask has been stripped in a method of fabricating a sensor according to the invention.

An oxygen-based RIE process is used to mill through the DLC 49 in the exposed area of the photoresist mask 51, then the photoresist mask 51 is stripped off. This leaves the DLC to serve as a mask for milling one or both of the two lead layers 45, 47 as shown in FIG. 4. The choice of material for the mask layer is constrained by the need for resistance to etching process used to remove the metallic materials used for the leads. Any appropriate material can be used including silicon dioxide.

Figure 5:
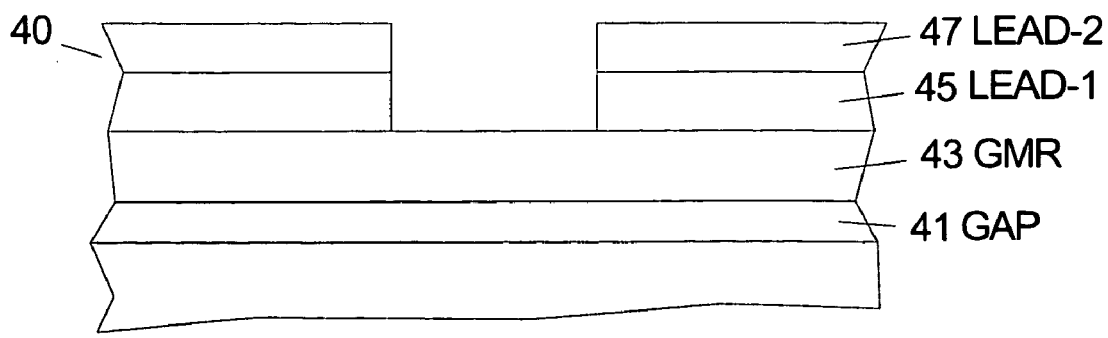
FIG. 5 is a symbolic illustration of a section, taken perpendicular to the surface of a wafer subsequent to FIG. 4, after lead layers over the active region of the sensor have been milled and the DLC mask layer has been removed in a method of fabricating a sensor according to the invention.

The state of the wafer after the two lead layers 45, 47 have been milled through according to the first embodiment that is not using ruthenium for lead-1 is shown in FIG. 5. After the lead layer or layers have been milled the DLC 49 is been removed by RIE.

Figure 6:
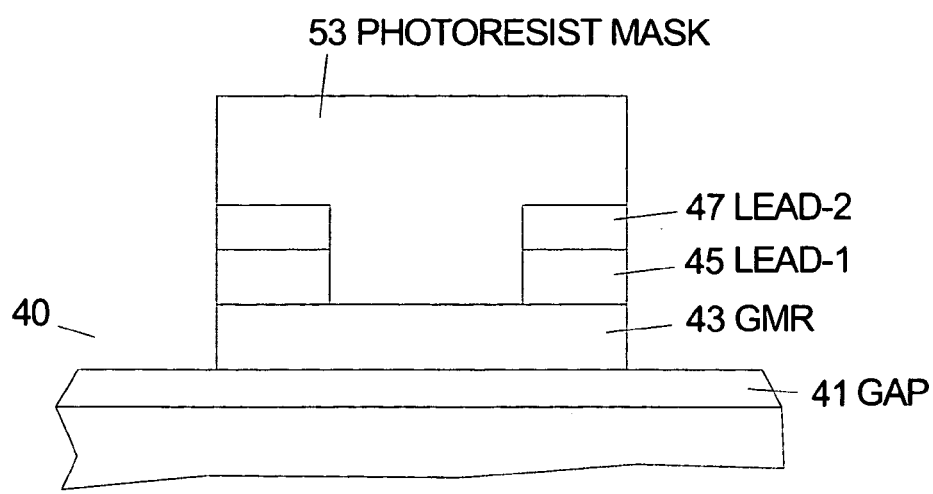
FIG. 6 is a symbolic illustration of a section, taken perpendicular to the surface of a wafer subsequent to FIG. 5, after the photoresist mask for the full width of the sensor has been patterned and the excess lead and sensor material has been milled away in a method of fabricating a sensor according to the invention.

The next step is to pattern a photoresist pad 53 over the full width of the sensor as shown in FIG. 6. The excess lead and sensor material around the pad 53 has been milled away exposing the sides of the leads and the GMR layer stack as shown in FIG. 6.

Figure 7:
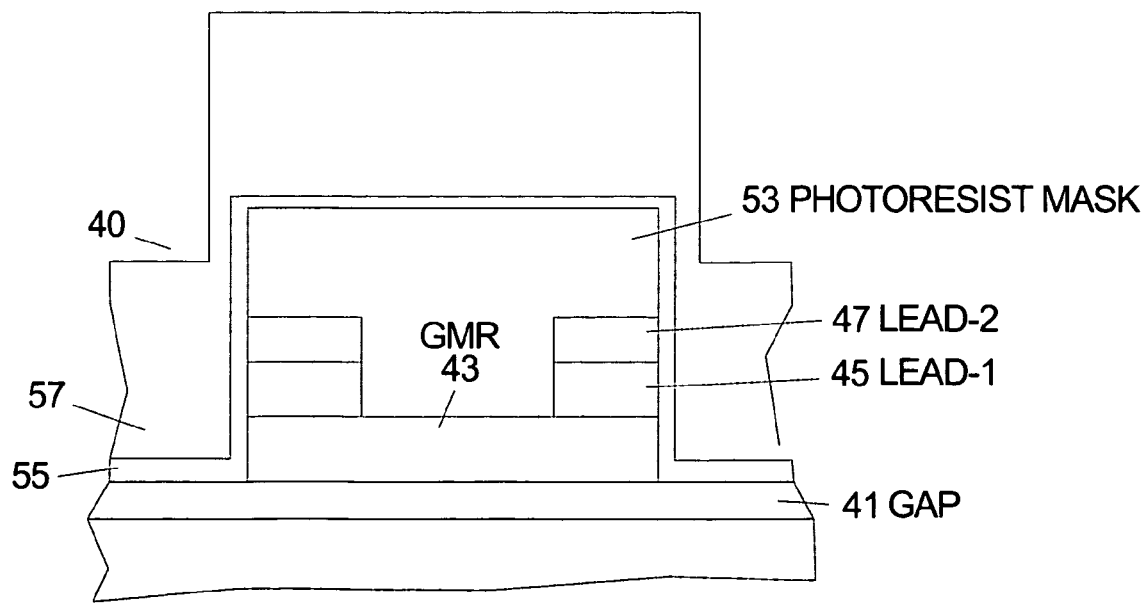
FIG. 7 is a symbolic illustration of a section, taken perpendicular to the surface of a wafer subsequent to FIG. 6, after the layers for the hard bias structures have been deposited in a method of fabricating a sensor according to the invention.
Figure 8:
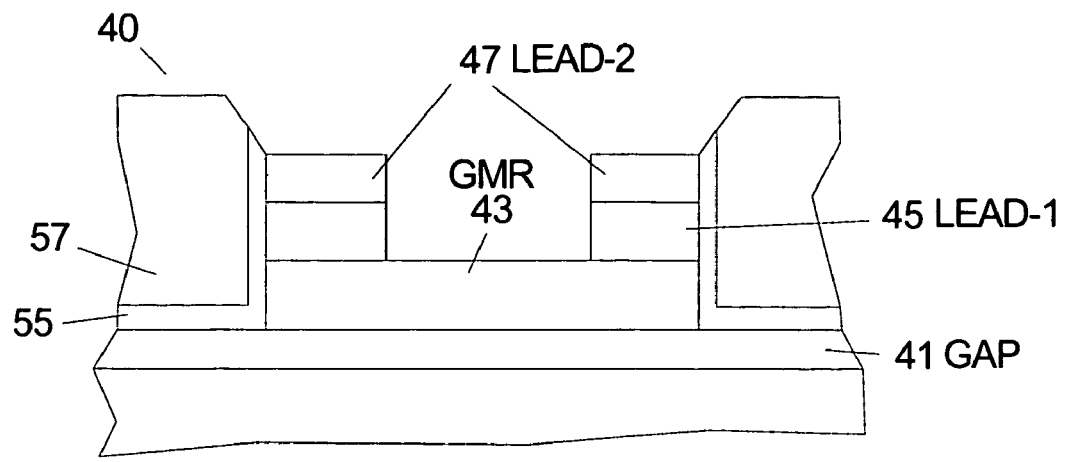
FIG. 8 is a symbolic illustration of a section, taken perpendicular to the surface of a wafer subsequent to FIG. 7, after the photoresist has been removed in a method of fabricating a sensor according to the invention.

The hardbias structures are deposited next as show in FIG. 7. The layers in the hardbias structures are selected according to the prior art. For example a layer of rhodium 55 is deposited followed by one or more layers for the magnetic material 57 for the bias. The photoresist 53 is then removed using a chemical-mechanical polishing (CMP) process with the result being shown in FIG. 8.

The prior process of fabricating a sensor can be resumed at this point. The exposed lead-2 material 47 and the hardbias structure 57 are in electrical contact with the sensor 43. The further development of the lead connections can be performed according to the prior art.

Figure 10:
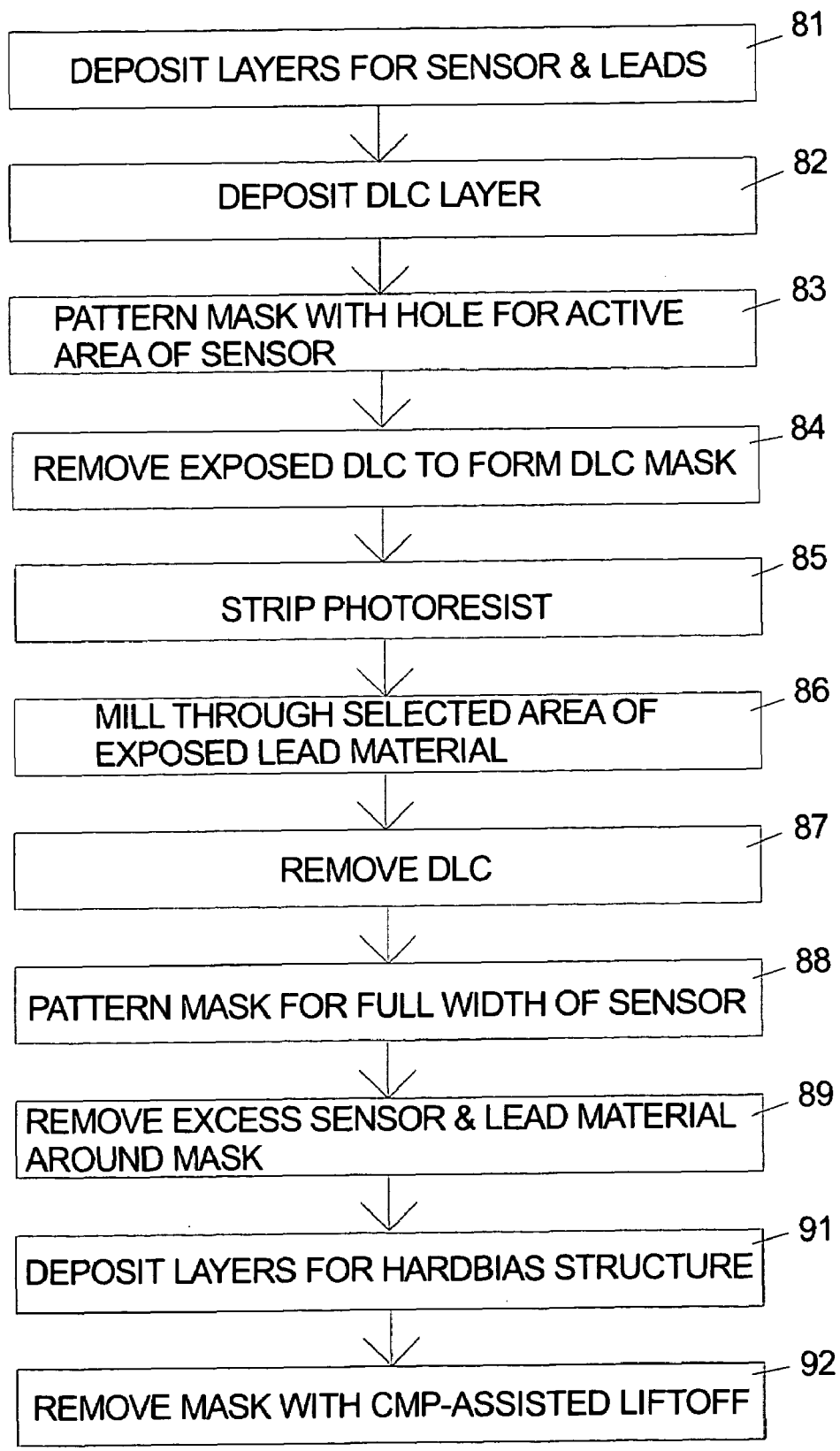
FIG. 10 is a flowchart of a method according to the invention.

FIG. 10 is a flowchart of a method according to the invention. The layers for the sensor and the leads are deposited sequentially on the wafer 81. The leads will preferably include two layers with the upper layer preferably being rhodium. The lower layer can optionally be ruthenium which can also serve as the cap layer for the sensor. Tantalum is another option for the first lead layer. A mask layer, preferably DLC, is deposited 82. A photoresist mask with a hole defining the active area of the sensor is patterned 83. The exposed area of the DLC mask over the active area of the sensor is removed by a RIE process that does not affect the metallic lead-2 layer 84. The photoresist is then stripped 85. A selected portion of the exposed lead material is then removed using the DLC as a mask 86. In the first embodiment of the invention, the first and second lead layers will be removed completely from the surface sensor exposed through the DLC mask. The DLC mask is then removed 87. A photoresist mask pad is patterned to define the full sensor width 88. The excess sensor and lead material exposed around the mask is milled away 89. The layers for the hardbias structure are deposited 91. The first layer of the hardbias structure can be rhodium followed by the remaining layers for the hard bias structure according to the prior art 91. The mask is then removed using a CMP-assisted liftoff 92.

The prior art can be resumed at this point. The typical process would deposit a material for the next gap layer, then the seed layer for the S2 shield for the read head.

Figure 9:
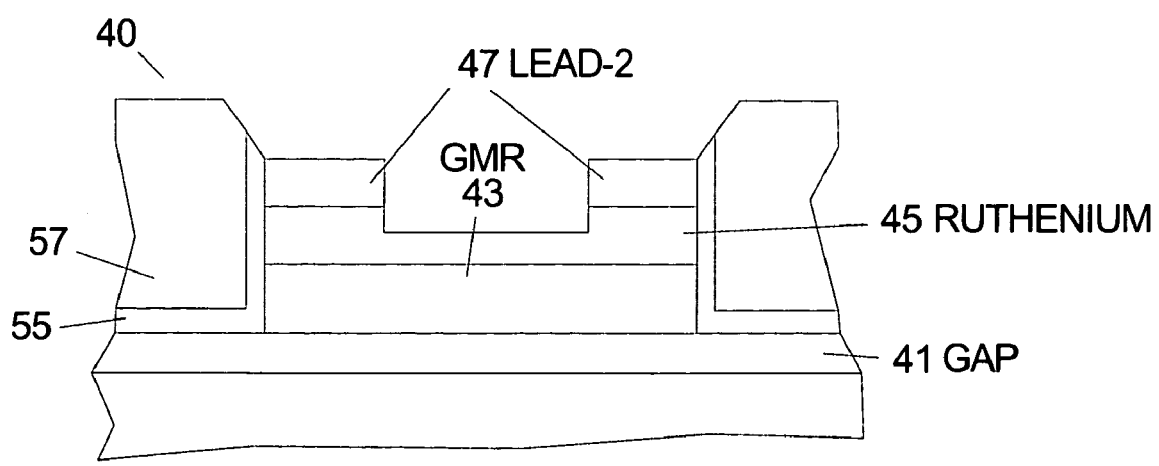
FIG. 9 is a symbolic illustration of a section, taken perpendicular to the surface of a wafer in an embodiment using ruthenium for lead-1 layer in a method of fabricating a sensor according to the invention.

In an alternative embodiment the use of ruthenium for the first lead layer 45 is preferred since it protects against oxidation of the sensor layers when the DLC mask layer 49 is ultimately removed by oxygen RIE. The ruthenium oxide, which is formed on the surface of the ruthenium layer during the RIE, is conductive, so it provides conductivity, as well as, corrosion protection. In the alternative embodiment, it is preferable to remove only the lead-2 layer 47 in the active area of the sensor. If the sensor has a ruthenium cap, it can serve as the first lead layer. When the first lead layer is ruthenium, then the second lead layer 47 will be removed completely in the active area of the sensor, but the ruthenium layer 45 can be left at least partially in place as shown in FIG. 9, which illustrates the structure of the wafer for the alternative embodiment using ruthenium for lead-1 layer 45. In this embodiment the ruthenium lead-1 layer is not completely removed, so it remains in the final structure, but otherwise the process in the alternative embodiment is the same.

The invention has been described with respect to particular embodiments, but other uses and applications for the thin film structures and methods according to the invention will be apparent to those skilled in the art.

The invention claimed is:

1. A method of fabricating a magnetic sensor on a wafer comprising the steps of:
    depositing thin film layers for the magnetic sensor on the wafer;
    depositing electrically conductive metallic material for overlaid leads over the thin film layers for the magnetic sensor;
    depositing a mask material comprising diamond-like carbon (DLC) or silicon dioxide over the electrically conductive metallic material for the overlaid leads;
    patterning a photoresist mask with a first hole defining a first predetermined area on the mask material selected to be an active area of the magnetic sensor;
    removing, using an oxygen-based RIE process, the mask material from the first predetermined area to form a lead mask with a hole over exposed electrically conductive metallic material that is not removed by the oxygen-based RIE process;
    stripping the photoresist mask off of the wafer leaving the lead mask;
    removing electrically conductive metallic material in the first predetermined area between first and second lead pads of electrically conductive metallic material that are protected from removal by the lead mask;
    removing the lead mask from the wafer; and
    removing the thin film layers for the magnetic sensor and the electrically conductive metallic material from a second predetermined area to define a width of the sensor, the second predetermined area being wider than the active area of the magnetic sensor and disposed to include first and second lead pads of electrically conductive metallic material and the active area of the magnetic sensor.

2. The method of claim 1 further comprising the step, executed before the step of removing the thin film layers, of patterning a photoresist pad over a predetermined area defining a width of the sensor that is wider than the active area of the sensor.

3. The method of claim 1 wherein the step of depositing electrically conductive metallic material further comprises depositing a layer of ruthenium.

4. The method of claim 1 wherein the step of depositing electrically conductive metallic material further comprises depositing a layer of tantalum.

5. The method of claim 1 wherein the step of depositing electrically conductive metallic material further comprises depositing a layer of tantalum and then depositing a layer of rhodium over the layer of tantalum.

6. The method of claim 1 wherein the step of depositing electrically conductive metallic material further comprises depositing a layer of ruthenium and then depositing a layer of rhodium over the layer of ruthenium.

7. The method of claim 1 wherein the step of depositing electrically conductive metallic material further comprises depositing a layer of tantalum and the step of removing electrically conductive metallic material over a first predetermined area further comprises removing the tantalum in the first predetermined area.

8. The method of claim 1 wherein the step of depositing electrically conductive metallic material further comprises depositing a layer of ruthenium and then depositing a layer of rhodium over the layer of ruthenium; and the step of removing electrically conductive metallic material over a first predetermined area further comprises removing the rhodium and leaving at least some of the ruthenium.

9. A method of fabricating a magnetic sensor on a wafer comprising the steps of:
    depositing a stack of thin film layers for the magnetic sensor on the wafer;
    depositing electrically conductive metallic material for overlaid leads over the stack of thin film layers for the magnetic sensor;
    depositing a selected mask material over the electrically conductive metallic material for the overlaid leads, the selected mask material comprising diamond-like carbon (DLC) or silicon dioxide;
    patterning a first photoresist mask with a first hole defining an active area of the magnetic sensor over the selected mask material;
    removing the selected mask material over electrically conductive metallic material in the hole to form a lead mask with a second hole over the active area of the sensor;
    striping the first mask off of the wafer;
    removing a selected portion of the exposed electrically conductive metallic material in the second hole in the lead mask;
    removing the lead mask from the wafer;
    patterning a mask pad over a predetermined area on the wafer defining a width of the magnetic sensor, the mask pad being wider than the active area of the magnetic sensor and being disposed to cover the active area and first and second pads of electrically conductive metallic material for overlaid leads; and
    removing the stack of thin film layers for the magnetic sensor and the electrically conductive metallic material disposed outside of the mask pad to establish the width of the sensor.

10. The method of claim 9 wherein the step of depositing electrically conductive metallic material further comprises depositing a layer of ruthenium.

11. The method of claim 9 wherein the step of depositing electrically conductive metallic material further comprises depositing a layer of tantalum.

12. The method of claim 9 wherein the step of depositing electrically conductive metallic material further comprises depositing a layer of tantalum and then depositing a layer of rhodium over the layer of tantalum.

13. The method of claim 9 wherein the step of depositing electrically conductive metallic material further comprises depositing a layer of ruthenium and then depositing a layer of rhodium over the layer of ruthenium.

14. The method of claim 9 wherein the step of depositing electrically conductive metallic material further comprises depositing a layer of tantalum and the step of removing a selected portion of the exposed electrically conductive metallic material for the overlaid lead material in the second hole in the lead mask further comprises removing the tantalum in the second hole.

15. The method of claim 9 wherein the step of depositing electrically conductive metallic material further comprises depositing a layer of ruthenium and then depositing a layer of rhodium over the layer of ruthenium; and the step of removing a selected portion of the exposed electrically conductive metallic material for the overlaid lead material in the second hole in the lead mask further comprises removing the rhodium in the second hole and leaving at least some of the ruthenium in the second hole.

16. The method of claim 9 further comprising the step, executed after removing the stack of thin film layers for the magnetic sensor, of depositing layers for the hardbias structure over the wafer.

17. The method of claim 16 further comprising the step of removing the mask pad using a CMP-assisted liftoff after depositing layers for the hardbias structure.

\* \* \* \* \*